United States Patent Office 3,496,560
Patented Feb. 17, 1970

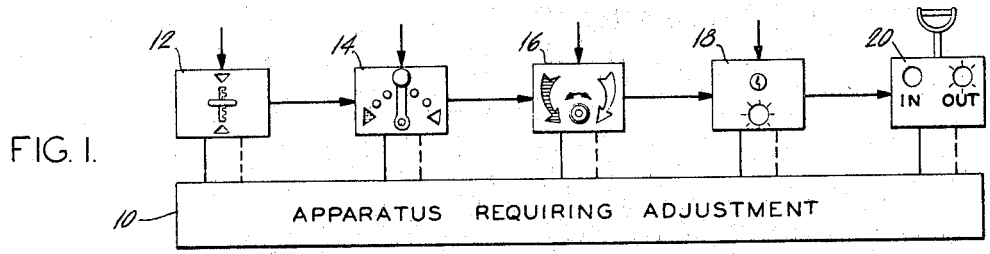
FIG. 1.
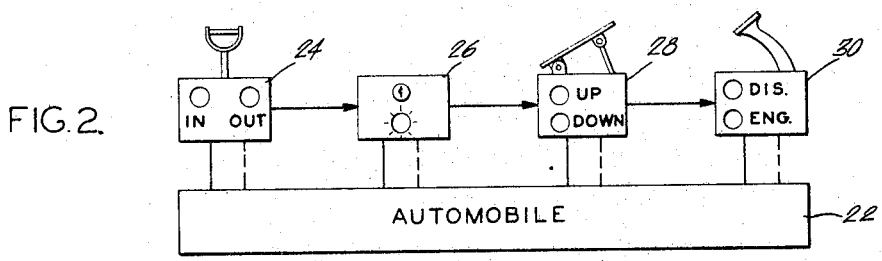
FIG. 2.
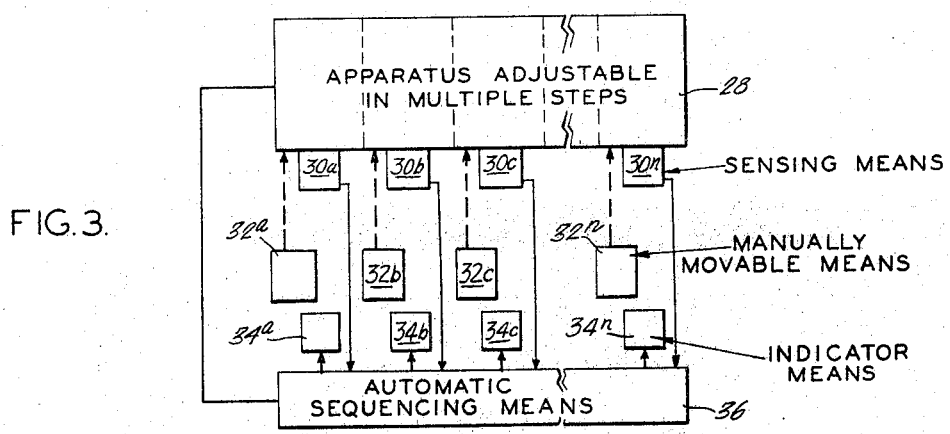
FIG. 3.
FIG. 4.
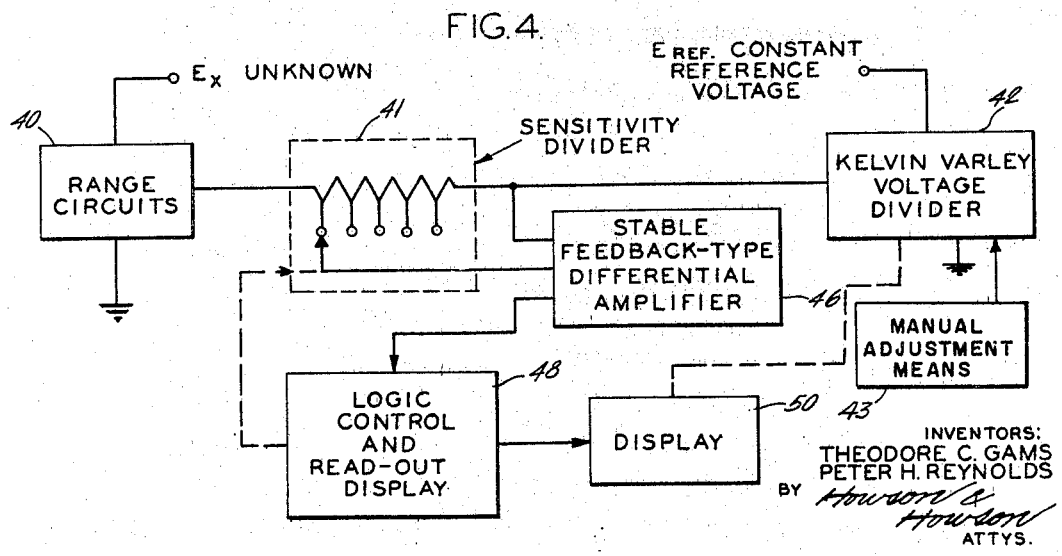
INVENTORS:
THEODORE C. GAMS
PETER H. REYNOLDS
BY Howson & Howson
ATTYS.

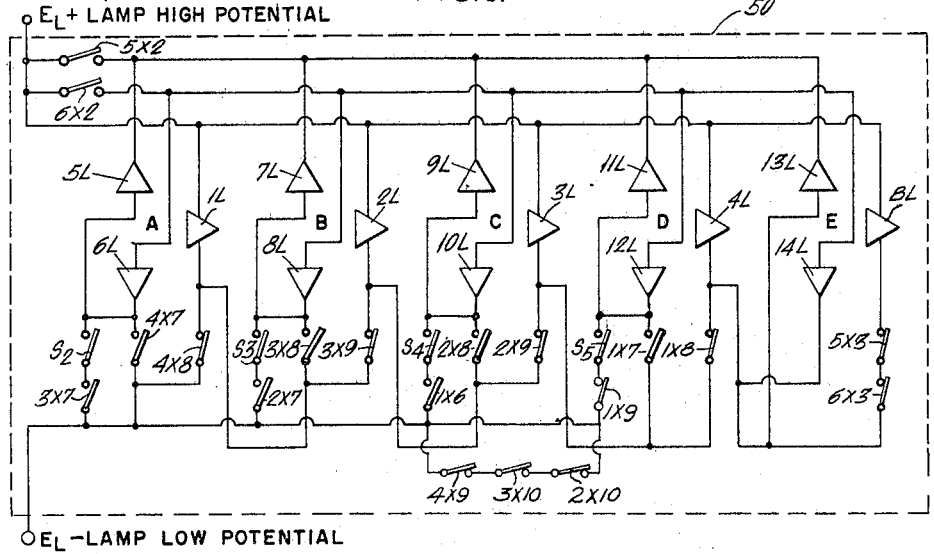
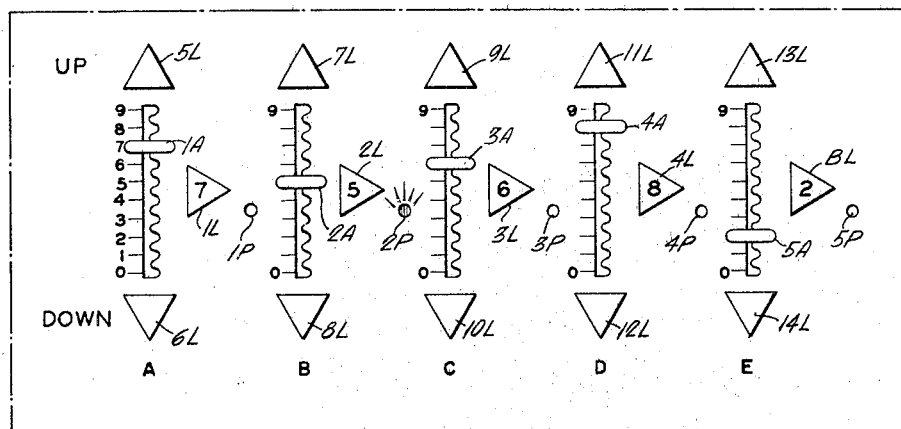
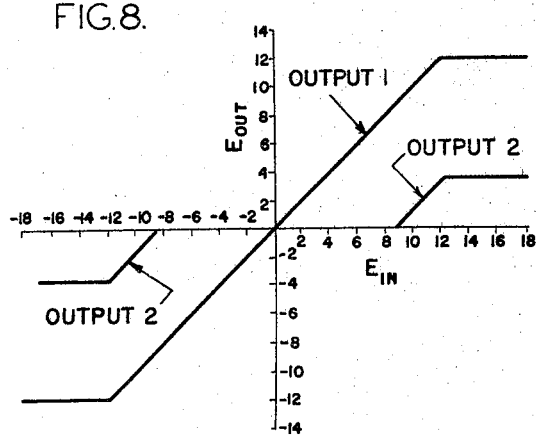

3,496,560
LOGIC ASSISTED MANUAL SYSTEM
Theodore C. Gams, Newark, and Peter H. Reynolds, Cherry Hill, N.J., assignors to James G. Biddle Company, Plymouth Meeting, Pa., a corporation of Pennsylvania
Filed Mar. 3, 1967, Ser. No. 620,415
Int. Cl. G08b 23/00
U.S. Cl. 340—313                                          35 Claims

ABSTRACT OF THE DISCLOSURE

A system for use with an apparatus requiring sequential multiple step adjustment wherein indicator means instructs an operator when and how to make each adjustment by means of adjustment means and is controlled through logic means in response to sensing means sensing effects produced by such adjustment in order to guide the operator in further adjustment.

---

The present invention relates to a logic assisted system to assist an operator in making adjustment of apparatus requiring sequential multiple step adjustment. More specifically the present invention preferably provides, in conjunction with a plurality of movable means for accomplishing sequential steps of adjustment, indicator means, which, in response to sensing means, indicate when and what action is to be taken by the operator to adjust the apparatus toward a predetermined condition. The present invention also employs logic means that causes the indicator means to become effective in a preferred sequence upon the accomplishment of previous steps of adjustment and monitors adjustment by the operator of each stage in said sequence until a predetermined condition has been attained.

The prior art has developed completely automatic equipment, including equipment that, in sequential steps, adjusts itself to some predetermined condition. Such equipment, however, is usually quite expensive to make and to maintain and may be quite elaborate, solely for the sake of being completely automatic. Such equipment may also be less reliable in respect to accuracy of achievement of a predetermined condition. In some cases, for a variety of reasons, it is desirable to have an operator make manual adjustments, particularly those that can be easily accomplished by an operator without the necessity of decision making. The present invention provides means whereby selected amounts of different steps may be left to an operator and preferably where the operator is directed how to make adjustment, whether or not he has any alternatives. Usually, adjustment is one in which there is movement involved, and the movement may be limited to two directions but with relatively wide limits as to amounts. By leaving relatively simple adjustment tasks to the operator but narrowing down the amount of discretion that the operator has, adjustment, time and skill qualities may be minimized so that a very unskilled operator can quickly adjust apparatus that might otherwise require a highly skilled technician. Furthermore, this same unskilled operator can make the adjustment was as great or greater (no carelessness or other error factors) precision as can a skilled technician since carelessness and other error factors can be and are minimized.

The present invention is limited to no specific type of system. It is applicable to a system in which the sequential tasks performed by the operator are essentially repetitive from step to step and it is equally applicable to a situation in which the various steps differ substantially from one another within a particular sequence. The variables sensed vary widely and include without limitation mass, length, time, temperature, position, any electrical parameters and pressure.

More specifically, the present invention is a logic assisted manual system that is combined with apparatus requiring sequential multiple step adjustment. In order to complete that adjustment, adjusting means, constituting part of the apparatus but also part of the system for completing adjustment, are provided for accomplishing each manual step. Separate sensing means are also provided for sensing each operation accomplished by each adjusting means.

Logic means, responsive to the outputs of the sensing means, and acting in accordance with predetermined logic patterns, causes adjustment indicator means to become active at appropriate times in a sequence determined by the logic without decision making on the part of an operator. The adjustment indicator means are associated with the adjusting means and indicate when movement is to be accomplished.

For a better understanding of the present invention reference is made to the drawings submitted herewith in which:

FIG. 1 is a block diagram of a generalized system in accordance with the present invention;

FIG. 2 is a similar block diagram of a system in accordance with the invention applicable to control of starting an automobile;

FIG. 3 is a similar block diagram of another system adjustable in sequential steps of similar type;

FIG. 4 is a block diagram of a specific embodiment of the generalized system of FIG. 3 applied to a determination of an unknown voltage by the use of a Kelvin-Varley voltage divider;

FIG. 6 is a circuit diagram of a display unit for the system of FIG. 5;

FIG. 7 is a front view of a display unit panelboard; and

FIG. 8 is a plot of voltages encountered at designated outputs of the circuit of FIG. 5.

Figure 5:
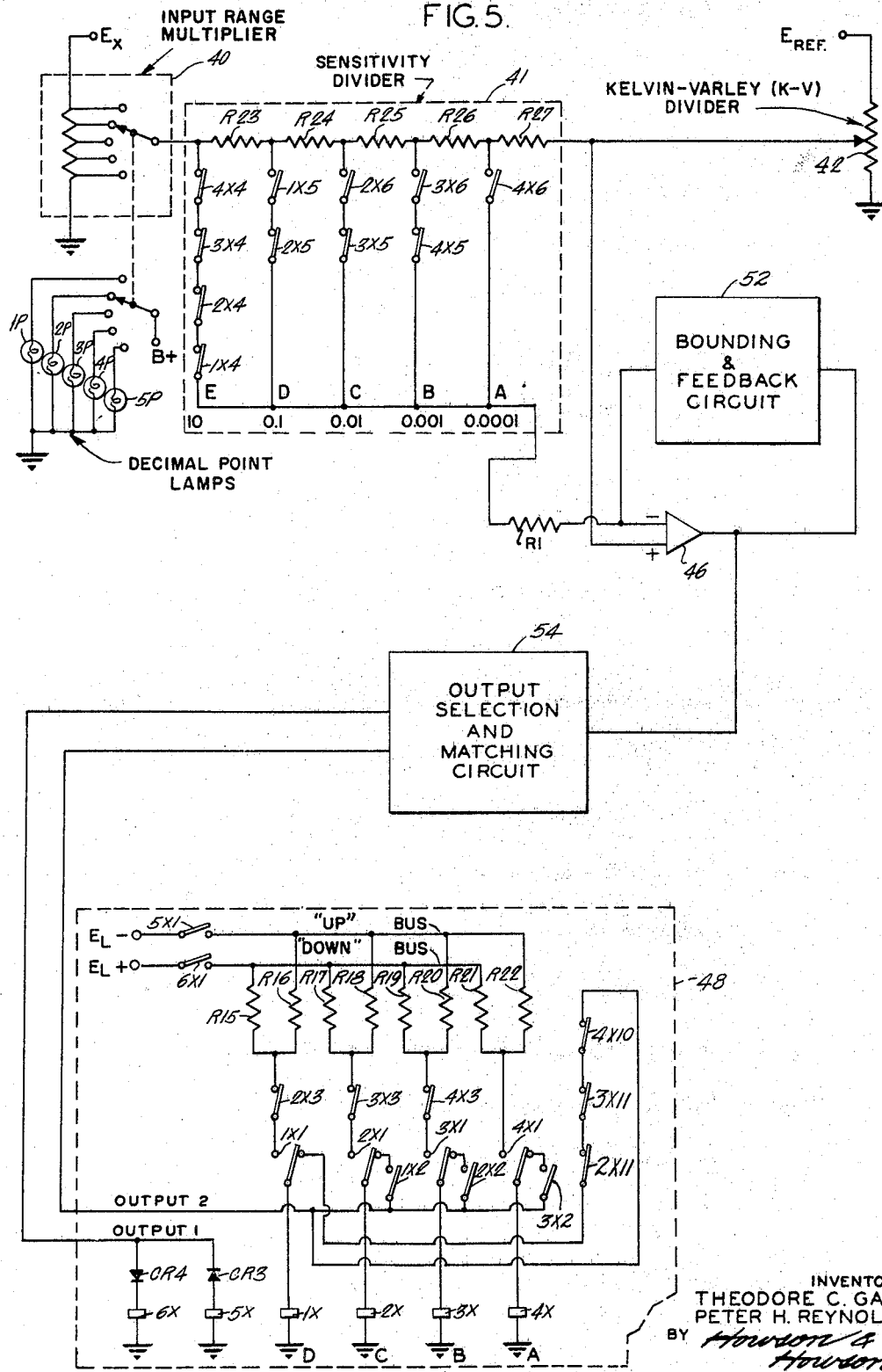
FIG. 5 is a circuit diagram showing in greater detail the system of FIG. 4.

FIGURE 1 shows in block diagram form a system wherein an apparatus requiring adjustment 10 is subject to manually adjustable controls 12, 14, 16, 18 and 20, which, in this case, are shown to include a variety of types of movable means for accomplishing adjustments, but which in other cases might be all of the same type or of different types including types different from those illustrated. Each of the controls is linked to apparatus requiring sequential adjustments by separate movable means for accomplishing each step of adjustment, including manually adjustable means, and each of the manually adjustable means has associated with it indicator means that are responsive to separate means for sensing the respective operations accomplished by each movable means either directly or by sensing the consequences of said accomplishments. The "link" between the movable means and the apparatus requiring adjustment is represented by a dashed line, whereas the solid line represents the "link" between the apparatus requiring adjustment and the indicator means associated with the movable means. In some cases these may be one and the same, depending upon the type of mechanism. Upon being switched on, an indicator, in the form, for example, of an illuminated arrow, indicates the proper direction for movement of the movable handle means of control 12, which is arranged so that it can be moved up or down. When proper positioning is obtained (i.e., neither too high nor too low) the indicator light is extinguished. Should the handle overshoot the correct setting, the other indicator light will be illuminated, indicating the necessity for reversing the movement. Upon proper adjustment of manually movable means of control 12, because of the action of suitable sequencing means, in the system logic, the indicator associated with the manually movable means of control 14 becomes illuminated. Again this is an illuminated arrow indicating the direction in which a movable switch arm is to be moved and movement is accomplished until sensing means associated with the mechanism detects that the arm is in proper position, at which time the light is extinguished. When the apparatus requiring adjustment is fully adjusted by manually movable means of control 14, suitable sequencing means provided in the logic means allows indicator means associated with movable means 16 to be activated. Again an illuminated arrow indicates the direction in which a rotatable handle may be turned to achieve proper adjustment, and, when this is accomplished, the illumination is extinguished and the sequencing means permits energization of the indicator means associated with control means 18. The manually movable means in this case is a key switch that has two positions and the indicator means is either an illuminated visible indicator or an audible buzzer or bell indicating, for example, that the then position of the two-position key should be changed. When the correct position is assumed and sensed the sequencing logic permits final adjustment by control means 20 which may have movable means in the form of a plunger adjustable inwardly or outwardly in accordance with the associated indicator means. The indicator means may be visual, in the form of a light identifying whether inwardly or outwardly is the proper direction of movement. In the system shown, when movable means of control 20 is properly adjusted, the adjustable mechanism is presumably completely adjusted to some predetermined desirable condition. Preferably the system is provided with an indicator actuated by its logic means which indicates when the desired result has been accomplished. (Not shown).

The description above should not be taken to imply that the sequence described is the only possible sequence. In accordance with the present invention the sequence selected in a particular situation depends upon the circumstances, including previous adjustments or any other external inputs into the apparatus, and is determined by the internal logic of the system. This may include multiple adjustments or readjustment of previously adjusted adjustment means.

A simple illustration of one possible application of such adjustable means is shown in the schematic system of FIG. 2 wherein the adjustable mechanism is an automobile 22 which has a manually positionable choke 24, an ignition switch 26, an accelerator or throttle 28, and a clutch 30. Suitable sensing means senses whether the choke is in proper position and causes one of a pair of lights to illuminate indicating whether adjustment should be inwardly or outwardly. Once the choke is in proper adjustment, the sequencing logic means shuts off the indicator light and permits the indicator means for the starter to be energized. The ignition key switch 26 is turned by the operator in visual response to a light or aural response to a buzzer. When the starter causes the engine to fire the indicator for the starter is stopped and the logic causes any needed adjustment of the throttle to be indicated again due to the sequencing means permitting indication of the proper direction of throttle adjustment by suitable illumination of one of a pair of lamps. When the throttle is suitably adjusted, and its associated indicator lamp extinguished, the clutch should be ready to be engaged and a visible or oral signal may be energized by the sequencing means. This last signal directing engagement of the clutch may be subject to other factors, such as suitable warm-up of the engine on a cold day, etc., which through the sequencing means may delay the time of operation.

Many applications of the present invention will occur to those skilled in the art, but a particular application has been selected for discussion in some detail. This application is shown in block diagram form in FIG. 3.

FIG. 3 shows in block diagram form a generalized system in combination with apparatus 28, which requires sequential multiple step adjustment. The apparatus 28 may have separate sensing means 30a, 30b, 30c . . . 30n associated with it for sensing the effect of movement accomplished by each manually movable adjusting means 32a, 32b, 32c . . . 32n. The apparatus may have additional or alternative sensing means unrelated to specific adjusting means. The manually movable adjustment means are so designed that there is a separate movable means for accomplishing each step required of the apparatus. While these movable means may more properly be part of the apparatus and specifically the part by which adjustment is accomplished, they are also, in a true sense, part of the logic assisted system. The means by which the manually movable adjusting means is adjustable, e.g., the handle, is integrated into the system in some way. Indicator means 34a, 34b, 34c . . . 34n are provided in conjunction with each of the movable means and are made responsive to an automatic sequence means 36. The indicator means may be one or a plurality of indicators, such as lights, indicating the direction in which movement is to be accomplished and when it is to be accomplished. Sensing means may detect in some cases merely position or change in position of the actual adjustment means. It may also sense the consequences of adjustment in the form of an intermediate or final effect produced by the adjustment. The logic system, which includes the sequencing means and possibly other elements, is programmed to respond to the sensing means to permit the preferred next step to be taken when a given step is sensed to be accomplished. Preferably, the logic system also controls the indicator means. In some cases the indicator means may be directly coupled to the sensing means to respond to a predetermined condition; in others the indicator means may include suitable logic of its own. In most cases, however, the logic, including the sequencing means, is intermediate between the sensing and the indicator means. The sequencing means 36 is logic means which also acts to cause the indicator means 34a, 34b, 34c . . . 34n to become effective in a preferred sequence upon the completion of the immediately previous step. In addition to indicating sequence, the adjustment indicator means shows direction of required adjustment as directed by the logic means.

Referring now to FIG. 4, the system illustrated is typical of a group of such systems that characteristically have an unknown voltage $E_x$ (modified by range circuits 40) compared to an adjustable reference (the output of Kelvin-Varley voltage divider 42) monitored by some sort of discrepancy-sensing device (sensitivity divider 41) and a discrepancy-responsive system 46. The discrepancy-responsive system 46 feeds a logic means 48, which, in turn, acts upon a display system 50. Just as the logic means 48 acts upon the display 50, so the logic means 48 also feeds back to re-adjust discrepancy sensing device 41. Moreover, adjustment is provided by manual adjustment means 43 in conjunction with the display. Adjustment as directed creates new conditions, which are, in turn, sensed by the discrepancy responsive system and the logic.

The system of FIG. 4 is not merely a typical embodiment of the invention. It is also a highly useful system which has specific novelty of its own. This system provides logic assisted balancing of a potentiometer, which may consist of series connected switchable decade resistors to establish a highly precise division of a precise total resistance value. The same general type of system may be applied to other electrical measuring networks but has particular value in this type of application since the information derived with the aid of the logic assisted visual display arrangement is such that a highly precise measurement can be obtained by relatively unskilled individuals in a minimum amount of time. Thus, for example, the device could be used in connection with a production line activity wherein an unknown voltage or unknown resistance, or other unknown parameter may be quickly determined by a bridge-balancing technique employing sequential steps of adjustment. These steps can be advantageously taken on a decimal-decade basis, so that they effectively amount to determining one decimal place of the unknown at a time. Adjustment of the sensitivity divider, which here is the sensing means 41, to increase sensitivity, following completion of adjustment of the adjustment means to the resolution of the previous decade, makes it possible to perform similar adjustment of the next smaller resistance decade.

This device is to be compared with a digital voltmeter on one hand or a differential voltmeter on the other. The digital voltmeter, while offering many of the advantages of the present invention, but relatively higher cost, does not maintain its accuracy and except for models of high cost and complexity can be relied upon for no more than a tenth or $\frac{1}{100}$ of 1%. It requires calibration every three months compared to a much longer time for an instrument of the present invention. The differential voltmeter, on the other hand, is relatively stable to twenty-five parts per million, which is of the same order of stability as the potentiometer of the present invention. However, it involves a tedious iterative adjustment demanding skill and interpretive ability and time to make interpretations and decisions. The present invention thus can be said to have the simplicity and stability of the differential voltmeter with almost the same ease and speed of balance as the digital voltmeter.

Certainly in common with other structure in accordance with the present invention, the system of FIG. 4 enables a relatively unskilled operator to adjust a precision potentiometer, or other measuring device to obtain an accurate and unambiguous result. Furthermore, unlike differential voltmeters and digital voltmeters, it is impossible to obtain a wrong reading from the device of the present invention because of the impossibility of reading the instrument until a condition of balance is obtained. This may be done with relatively simple electrical circuits which do not degrade the basic accuracy of the measuring system. Because of the simplicity of the instrument, the instrument is inherently reliable and the logic-assisting manual feature does not greatly increase the cost of the instrument. Certainly the logic assisted manual feature may employ techniques which are not relatively highly expensive. The display or readout device permits extensive and highly refined and effective application and exploitation of human engineering principles. The unit can also be used in other ways, such as a "limit" indicating device which indicates balance between two references at any given setting; voltages which are not completely stable can be observed and some determination of the magnitude made. The technique can be easily utilized to measure almost any electrical parameter and specifically DC voltage, DC current, AC voltage, AC current, and ratios of voltages, currents, resistances, reactances, and impedances.

In the preferred embodiment as shown in FIG. 4 the unknown fixed system has a voltage ($E_x$) source which is applied to a ranging circuit 40. The output of the ranging circuit is compared with voltage at the output of an adjustable system, which in this case is the output tap of the Kelvin-Varley voltage divider 42 which has a reference voltage $E_{ref}$ applied across the divider. In this system the Kelvin-Varley voltage divider is adjusted until the output of the voltage divider equals the unknown voltage as adjusted (i.e., divided by the ranging circuits 40). Discrepancy between the two voltages is sensed by the sensing means, which in this case is sensitivity divider 41, which provides multiple taps for changing sensitivity of a discrepancy-responsive system 46. Discrepancy-responsive system 46 in this case is a D.C. operational (stable feed-back differential) amplifier 46. In a practical situation, a power amplifier may be needed following the operational amplifier 46. The tap of the sensitivity divider is preferably automatically selected in one of the number of ways in response to the amplifier output, as will be described. The logic in this instance includes a switching circuit 48, which controls the switching of the tap of sensitivity divider 41 and the display 50. The logic could be of any one of several other types, such as solid-state logic but here advantageously employs reed relays. This switching in connection with the sensitivity divider will be explained in connection with the logic.

Referring now to FIG. 5, most of the system of FIG. 4 is shown in greater detail. The effective tap or output of the sensitivity divider 41 is connected to differential amplifier 46, and specifically to the negative terminal thereof through resistor R1. The positive input terminal of the amplifier 46 is connected to that side of the sensitivity divider 41 which is connected to the output of the Kelvin-Varley voltage divider 42. The output of the amplifier is both fed back to the input through bounding and feed-back circuit 52 and to the input of output selection and matching circuit 54. There are two outputs, outputs 1 and 2, from circuit 54 which in turn feed logic 48. The feedback circuit 52 and the circuit 54 are of conventional type known to those skilled in the art.

Output 1 is divided into two parallel paths to ground, only one of which operates at a time, depending upon the polarity of the potential appearing at the output of the discrepancy responsive system 46. Current rectifiers CR3 and CR4 in the respective paths are directed in opposite directions. Therefore, a current of one direction will operate relay 5X whereas the current of opposite directions will operate relay 6X. The current which appears at the output of the amplifier 46 approaches zero only if the circuit is in balance for the particular sensitivity selected that is, if the voltage from the Kelvin-Varley (K-V) divided equals the output of the range multiplier. Otherwise, it will be positive or negative, depending upon whether upward or downward adjustment of the Kelvin-Varley potentiometer is indicated.. The current rectifier CR3 is directed so that relay 5X will be energized if the unbalance is sufficient that an adjustment is required, and the specific adjustment required is upward; and CR4 is arranged so that relay 6X will be energized if adjustment in the downward direction is indicated.

The circuit for producing output 2 is so constituted that it permits no current flow until a selected critical voltage of either polarity direction is exceeded. Therefore, voltage will not appear on output 2 until the amplifier output voltage exceeds, for example, 8.5 volts positive or negative. Characteristically, the voltage on outputs 1 and 2 can be plotted against input voltage as shown in FIG. 8. The logic system 48 operates on the outputs 1 and 2 and consists of the circuitry associated with them.

At least 8.5 volts are required before the excess above that potential will appear on output 2 and since the assumption will be that all relays require 5 volts for operation, the output of amplifier 46 must reach 9.0 volts before the relay 1X is energized through the normally closed contact of its pole 1X1 and the normally closed contacts 2X11, 3X11 and 4X10. When the voltage across it exceeds the predetermined minimum level of .5 volts, the relay 1X will close its normally open contacts, including the normally open contacts of pole 1X1 and open its normally closed contacts. The normally open contacts of switch 1X1 will then connect thte relay through the normally closed contacts 2X3 and through resistor R15 or resistor R16 to the down bus or up bus to hold the relay 1X on. The up bus is energized when normally open contacts 5X1 of relay 5X are closed as that relay is energized as the result of a current flow indicating the need for upward adjustment of the Kelvin-Varley potentiometer output voltage whereas down bus is energized when normally open contacts 6X1 of relay 6X are closed as that relay is energized as the result of a current flow indicating the need for downward adjustment. In either case, the latching voltage $E_L{-}$ or $E_L{+}$ is applied to the bus selected by its closed switch contacts 5X1 or 6X1. One or the other of the switch contacts 5X1 or 6X1 will be closed if there is no balance, but if balance occurs neither one of the relays 5X or 6X will be energized and there will be no potential on either bus energized through contacts 5X1 or 6X1. The potential applied through a bus, a resistance, normally closed contacts 2X3 and relay 1X will keep relay 1X energized until and unless relay 2X is energized. Energization of relay 1X activates the portions of the equipment marked D as will be described hereafter.

If output 2 remains above 9 volts, as may frequently happen, it is applied to relay 2X from output 2 through normally open contacts 1X2 and the normally closed contacts of relay pole 2X1, relay 2X will be energized. The normally open contacts of pole will close and relay 2X will then be energized by latching potential $E_L{+}$ or $E_L{-}$ from the up or down latching voltage bus through contacts 6X1 or 5X1 and resistance R17 or R18 respectively. In either event, the potential will be applied across normally closed contacts 3X3 to hold the relay 2X energized latched in condition once it is energized until contacts 3X3 are opened. The energizing of relay 2X will open the contacts 2X3 and de-energize the relay 1X. Energization of relay 2X activates portions of the equipment marked C as will be described hereafter.

Potential is applied across relay 3X through normally open contacts 2X2 and the normally closed contacts of relay pole 3X1. Once energized, relay 3X will cause the switch 3X1 to close its normally open contacts and to open its normally closed contacts. In the latching position of switch 3X1, the relay 3X will be connected through contact 4X3 through either resistor R19 or resistor R20 to down or up latching bus depending upon which switch, 6X1 or 5X1, is closed, and thereby to the latching voltage $E_L{+}$ or $E_L{-}$. When relay 3X is energized the normally closed switch 3X3 will open to remove the latching voltage from relay 2X and relay 2X will become de-energized. Energization of relay 3X activates the portions of the equipment marked B as will be described hereafter.

Energization of relay 3X causes switch 3X2 to close, connecting output 2 through normally closed contacts of relay pole 4X1 to energize relay 4X. Relay 4X causes switch 4X1 to close its normally open contacts and open its normally closed contacts which connect relay 4X directly through either resistor R21 or R22 to the down or up bus, depending upon whether contacts 6X1 or 5X1 are closed, to the latching potential $E_L{+}$ or $E_L{-}$. When relay 4X becomes energized its normally closed contacts 4X3 in series with relay 3X are open thereby de-energizing relay 3X from its holding circuit. Energization of relay 4X activates the portion of the equipment marked A, as will be described hereafter.

The relays 1X, 2X, 3X and 4X in sequence cause the sensitivity divider 41 to decrease its sensitivity in successive stages by sequential energization of these relays causing parts of the resistance of the sensitivity divider across the amplifier 46 to be sequentially removed. Normally closed contacts 1X4 are in series with normally closed contacts 2X4, 3X4, and 4X4 connecting the full voltage across the divider to the negative terminal of amplifier 46 through resistor R1. Therefore, when contacts 1X4 are opened by energization of relay 1X, the effect is to remove resistor R23 and the voltage across it from the amplifier. Energization of relay 1X also causes normally open contacts 1X5 to close so that the potential is taken between resistors R23 and R24 across resistors R24, R25, R26 and R27, representing .1 of full voltage across the sensitivity divider 41. This voltage is applied across normally closed contacts 2X5 and resistor R1 to the amplifier input.

Subsequently, as relay 2X is energized, normally closed contacts 2X5 open and normally open contacts 2X6 close. As relay 1X is de-energized after relay 2X is energized normally closed contacts 2X4 will open before normally closed contacts 1X4 reclose and normally open contacts 1X5 reopen. Thus the amplifier is connected through resistor R1 through normally open contacts 2X6 which are closed and normally closed contacts 3X5 to a point between resistors R24 and R25 thus applying to the amplifier .01 potential appearing across the divider 41.

Subsequently, as relay 3X is energized, the normally closed contacts 3X5 will open and the normally open contacts 3X6 will close connecting the amplifier across resistor R1 to the point between resistors R25 and R26 to .001 voltage across the sensitivity divider. When relay 2X becomes de-energized normally open contacts 2X6 reopen and the normally closed contacts 2X5 and 2X4 reclose. However, contacts 3X4 open before contacts 2X4 reclose.

Finally, as relay 4X is energized, normally closed contacts 4X4 and 4X5 open and normally open contacts 4X6 close connecting the amplifier through resistor R1 to .0001 sensitivity divider voltage between resistors R26 and R27. When relay 3X becomes de-energized normally open contacts 3X6 reopen and normally closed contacts 3X4 and 3X5 reclose.

The letters A, B, C, and D indicate the corresponding portions of sensitivity divider and display circuitry which are activated as relays 4X, 3X, 2X and 1X are energized. Portion E is activated when no relay is energized. If the instrument is far from balance, the relays 1X, 2X, 3X and 4X operate in sequence, thus changing from the most sensitive to the least sensitive state. If the Kelvin-Varley divider is now adjusted to approach the balance condition, so that output 1 falls below .75 volt, both relays 5X and 6X become de-energized. Contacts 5X1 and 6X1 then are both open, and relay 4X becomes de-energized. This returns the system to the initial state, that is, none of the relays 1X, 2X, 3X, or 4X is energized, and the sensitivity divider is at maximum sensitivity. Relays now operate in the sequence previously described until the sensitivity drops so that output 2 falls below 8.5 volts, or until relay 4X again operates. If, as in the usual case, the sequence stops when relay 3X operates (because the Kelvin-Varley has been adjusted toward balance so that at minimum sensitivity the output of amplifier 46 fell below .75 volt; hence at the next higher sensitivity it must be less than 7.5 volts, i.e., not enough to operate relay 4X). If the K-V divider is now adjusted closer to balance, so that output 1 falls below .75 volt, a similar cycle occurs, ending with relay 2X energized. On further finer adjustments of the K-V output, similar cycles occur ending with relay 1X energized, and finally all four relays de-energized, the most sensitive state.

Referring now to FIG. 6, the circuit shown is the lamp indicator circuit containing indicator lights showing the balance or imbalance in successive stages identified by the letters A, B, C, D and E to correspond to the relay logic and sensitivity divider switching of FIG. 5. Balance is indicated at each stage by lamps 1L, 2L, 3L, 4L and BL. Lamps indicating a need for upward adjustment are lamps 5L, 7L, 9L, 11L and 13L and lamps indicating a need for downward adjustment are lamps 6L, 8L, 10L, 12L and 14L. These lamps are connected into circuits such that the lamps showing need for upward adjustment of Kelvin-Varley resistance are connected to a high lamp potential $E_L{+}$ through normally open switch contacts 5X2 which are closed when relay 5X is energized. Lamps showing need for downward adjustment of Kelvin-Varley resistance are connected to the same $E_L{+}$ potential through normally open contacts 6X2, when relay 6X is energized. The lamps showing a balance condition are connected directly to the $E_L{+}$ potential and are connected to that potential all the time and not through switch contacts. The respective lamps are illuminated when connected across the lamp voltage $E_L+$ and lamp voltage $E_L-$ through switch contacts, which will be described. Connecting the up or down lights to the $E_L-$ bus are normally open relay contacts 4X7. Connecting the balance lamp 1L to the voltage is normally closed contact 4X8. Thus, if the system is far off balance causing relay 4X to operate, contacts 4X7 close permitting either lamp 5L or 6L to be lit depending upon whether switch contacts 5X2 or 6X2 are closed. If adjustment is made in the direction indicated by lamps 5L or 6L at the Kelvin-Varley voltage divider (FIG. 7), when a balance is achieved the relays will recycle as described previously, causing relay 4X to be de-energized, extinguishing lamp 5L or 6L. Normally closed contacts 4X8 now close causing lamp 1L to light.

If sufficient potential exists at the .001 tap of the sensitivity divider relay 3X will remain energized so that the B section of the relays, sensitivity divider and display will be effective. The out-of-balance condition will be indicated by illumination of light 7L if the switch contacts 5X2 are closed or 8L if switch contacts 6X2 are closed. Illumination is possible because the normally open contacts 3X8 are also closed to the $E_L-$ bus through the normally closed switch contacts 4X8. At the same time the normally closed contacts 3X9 will be open and remain open until a new balance is achieved, due to adjustment of the K-V divider by handle 2A (FIG. 7) as called for by lamp 7L or 8L at which point relay 3X will be de-energized. Lamps 7L or 8L, whichever had been illuminated, will be extinguished as contact 3X8 opens, and normally closed contacts 3X9 will reclose illuminating balance light 2L. Balance light 1L remains illuminated.

Potential will then be applied to lamp 9L or 10L (as the sensitivity becomes such that relay 2X remains energized) through the normally closed contacts 4X8 and 3X9 by way of normally open contacts 2X8. Light 9L will be illuminated if normally open contacts 5X2 are closed indicating upward adjustment of the decade of the Kelvin-Varley divider is needed or lamp 10L will be illuminated if normally open contacts 6X2 are closed indicating downward adjustment is needed. The balance light 3L is not illuminated since the normally closed contacts 2X9 are open as long as relay 2X remains energized. Upon achievement of a new balance relay 2X is de-energized and the normally closed contacts 2X9 reclose and balance light 3L is illuminated as light 9L or 10L is extinguished upon the opening of contacts 2X8. The relays then recycle and in the usual case, will stop with relay 1X energized.

At this point the $E_L-$ potential is applied through normally closed contacts 4X8, 3X9, 2X9, and normally open contacts 1X7. Lamp 11L will be illuminated if normally open contacts 5X2 are closed or lamp 12L will be illuminated if normally open contacts 6X2 are closed. At the same time balance light 4L will be extinguished as long as normally closed contacts 1X8 are open due to the energization of relay 1X. When adjustment is made and a new balance is accomplished, relay 1X is de-energized, contacts 1X8 will reclose illuminating balance light 4L and contacts 1X7 will reopen extinguished light 11L or 12L. At this stage is applied through normally closed contacts 4X8, 3X9, 2X9, 1X8 to lamp 13L or 14L depending upon whether the normally open up indicating contacts 5X2 are closed or normally open down indicating contacts 6X2 are closed. Normally closed contacts 5X3 or 6X3 are open during this process until a further and final balance is achieved and therefore balance light BL does not become illuminated until this time. When balance is achieved the normally open contacts 5X2 or 6X2 will reopen, extinguishing light 13L or 14L and the normally closed contacts 5X3 or 6X3 will reclose, illuminating the balance light BL.

In an ideal system balancing proceeds with the presumption that it will make an orderly advance from the least sensitive (largest decimal place) to the most sensitive (smallest decimal place). However, in the practical use of a polarity sensitive system sensed by relays 5X and 6X, it is possible for en error to occur so that it is necessary to go back one decimal place and correct. The switches $S_2$, $S_3$, $S_4$ and $S_5$ serve this function and are actuated by the means setting their respective decades of the Kelvin-Varley divider, e.g. $S_2$ is activated by lever 2A (FIG. 7). Specifically when the setting of a particular decade becomes 9 or 0 the switch corresponding to that decade closes in the previous less sensitive stage and the unbalance of the previous stage can then be corrected for. This depends on energization of the relay in the stage of greater sensitivity to close normally open contacts 3X3, 2X7 or 1X6, respectively, or in the case of $S_5$, this depends on the de-energization of the relays 1X, 2X, 3X and 4X to open normally closed contacts 1X9, 2X10, 3X10, and 4X9. For example, consider the adjustment of decade resistances for two adjacent decimal places. Suppose that the Kelvin-Varley divider setting for the second decimal place digit is greater than the corresponding digit of the unknown measured voltage by more than the voltage required to operate the relays at output 2 of the amplifier when the sensitivity for that second decimal place digit is in effect. When the operator adjust the first decimal place digit, a balance is achieved at a setting one count lower than the true value of the unknown. However, in adjusting the second decimal place digit upward, as the arrow indicates, the maximum (9) position will be reached without achieving a balance. As a consequence the up arrow on the first decimal place digit is illluminated through the normally open contact 5X2, switch $S_2$, and the normally open contact 3X7.

If the operator now adjusts the first decimal place digit upward in response to the arrow, the output of the Kelvin-Varley divider increases by an amount sufficient to reverse the output voltage of the amplifier, causing K5 to be de-energized, and the Up arrow at the first decimal place digit to be extinguished. The correct higher decimal place digit has now been established and lower decimal place digits may be balanced in the manner previously described.

An example of a situation in which such problems occur is where the value to be measured and the setting of the Kelvin-Varley divider are very close to a whole number (i.e., where value to be measured is 3.9998 volts and the Kelvin-Varley divider is set at 4.0000 volts). This effect can be minimized by increasing the resolution of the system and in certain cases can be made negligible from a practical point of view.

We claim:

1. In combination with apparatus requiring sequential multiple manual adjustments to achieve a predetermined condition, a logic-assisted system for completing such adjustments comprising a plurality of separate manually operated adjusting means for accomplishing each step of adjustment, sensing means for sensing an effect of each adjustment accomplished by each adjusting means, logic means responsive to the outputs of the apparatus, including the ouputs of the sensing means, and adjustment indicator means associated with each of the adjusting means said indicator means being activated by the logic means in a sequence determined by the order in which their associated adjustment means is ready to be operated and each giving complete instructions in response to the logic means to an operator on what is to be next accomplished with its associated adjusting means, when in sequence it is to be accomplished, and when it is completed and the next operation is ready to be performed, all without requiring decision making on the part of an operator, wherein said sequence of adjustments is not determined in advance of the adjustment process but depends on the course of adjustment.

2. The logic-assisted system of claim 1 in which the logic means is effective to cause the proper sequence in adjustment indicator means so that as a given adjustment is completed the logic means will cause the next manually operated adjusting means and its associated adjustment indicator means to become active.

3. The logic-assisted system of claim 1 in which status indicator means indicates the status of some condition relating to the apparatus requiring adjustment.

4. The logic-assisted system of claim 3 in which status indicator means indicates proper completion of a step by one of the manually operated adjusting means and readiness for a next step.

5. The logic-assisted system of claim 4 in which status indicator means are provided at each adjusting means to indicate completion of adjustment by that means.

6. The logic-assisted system of claim 5 in which the status indicating means are illuminable.

7. The logic-assisted system of claim 5 in which the status indicating means remain active until the apparatus is fully adjusted.

8. The logic-assisted system of claim 7 in which the status indicating means are illuminable in the sequence in which their associated manually operated adjusting means are adjusted and once illuminated remain illuminated until the apparatus is fully adjusted.

9. The logic-assisted system of claim 1 in which the logic means causes the adjustment indicator means to indicate direction of the next required step of manual adjustment and movement of the associated manually operated adjusting means by which such adjustment is to be made.

10. The logic-assisted system of claim 1 in which the manually operated adjusting means each includes a handle which is the portion of the adjusting means associated with the adjustment indicator means, said handle being limited in the directions in which it can be moved to perform adjustment.

11. The logic-assisted system of claim 10 in which the adjustment indicator means is visual in nature and indicates the proper direction of adjustment of its associated handle.

12. The logic-assisted system of claim 11 in which the handles are capable of linear movement.

13. The logic-assisted system of claim 11 in which the indicator means are illuminable to indicate the direction in which the handles are to be moved.

14. The logic-assisted system of claim 13 in which the adjustment indicating means associated with each of one or more handles consists of a pair of illuminable signals of which only one of a pair is illuminated at one time to indicate the required direction of movement.

15. The logic-assisted system of claim 13 in which only the adjustment indicator means associated with the particular adjustment means requiring adjustment is illuminated at a particular time.

16. The logic-assisted system of claim 12 in which the system is a decimal system wherein the adjustment accomplished by each handle represents the decade adjustment within a predetermined decimal place.

17. The logic-assisted system of claim 16 in which the system is arranged so that the handles and adjustment indicator means are in the proper decimal place sequence of the number represented by their settings and the system is calibrated so that handle position represents a selected number in the decade.

18. The logic-assisted system of claim 17 in which the indicators are oppositely directed pairs of pointers indicating by illumination of one pointer the direction of required movement of its associated handle of the adjusting means.

19. The logic-assisted system of claim 18 in which the indicators are pairs of aligned and oppositely directed pointers positioned to show the direction of adjustment of each adjustment means handle.

20. The logic-assisted system of claim 18 in which the adjusting means are arranged to move in planes parallel to one another and the adjustment indicator means are arranged on a common panel board and the logic means controls the illumination so that no more than one adjustment indicator means is illuminated at one time.

21. The logic-assisted system of claim 17 in which individual status indicator means are provided for each manually operated adjusting means and each such indicator means is illuminated when proper adjustment of its adjusting means is completed.

22. The logic-assisted system of claim 1 in which separate adjustment indicators relate to a decimally organized numerical sequence and the logic means determines the proper decimal place sequence for the next step of operation of the manually operated adjusting means and associated sensing and indicator means upon the proper adjustment of adjusting means for the previous decimal place and indicates its determination by appropriate status indicator means.

23. The logic-assisted system of claim 22 in which the logic means includes switch means having a predetermined switching sequence and sensitivity control determining which decimal place decade is to be adjusted.

24. The logic-assisted system of claim 1 in which the sensing means is sensitive to both magnitude and direction.

25. In an electrical system for comparing values of a pair of electrical parameters in terms of potential differences and successively manually adjusting one of said electrical parameters toward a predetermined criterion of potential differences at each of a predetermined number of resolution levels,
means for establishing appropriate sensitivity levels,
a plurality of separate manually operated adjusting means, at least one adjustment means for each selected level of resolution to adjust the adjustable electrical parameter at its selected level of resolution,
a logic system for responding to the difference between the two electrical parameters as manually adjusted by the adjusting means at each selected resolution level and at a predetermined condition of adjustment changing the sensitivity level and
adjustment indicator means directly associated in physical proximity with each of the adjusting means, said indicator means being activated in a sequence determined by the logic means and responding to the logic means to indicate the direction of adjustment of said adjustment means to approach said predetermined criterion of potential difference, said indicator means being integrated with the adjustment means to suggest by its position the proper adjustment to be made in response to directions from the indicator means.

26. The system of claim 25 in which the logic system is means acting in accordance with predetermined logic patterns to cause the indicator means to become active at appropriate times in a sequence determined by the logic without decision making on the part of an operator.

27. The system of claim 26 in which the means for establishing successive sensitivity levels is voltage divider means connected across said potential difference and having taps representative of successively selected sensitivity levels.

28. The electrical system of claim 25 in which an output of the means for establishing appropriate sensitivity levels is switched from one sensitivity level to another in response to relay means in the logic system, the logic system and the relays are sensitive to voltage level and attain a stable condition dependent upon voltage level to properly set the sensitivity divider at each stage.

29. In a system for determining an unknown voltage by comparison of the unknown with a reference voltage generated by a calibrated EMF source and potentiometer said potentiometer having several stages of manual adjustment, each successive stage being of greater resolution and each stage of adjustment being made by a separate manually operated adjustment means, said system also including sensing means for sensing the magnitude and polarity or phase of the difference between the unknown voltage and the reference voltage, and also including means for establishing in steps the sensitivity of the sensing means, a logic means responsive to the output of the sensing means, and adjustment indicator means including a display device directly associated in physical proximity with each of the adjusting means of the potentiometer, and being controlled by said logic means which causes the indicator means to indicate in a preferred sequence which adjusting means if any is to be adjusted, and in which direction.

30. The system of claim 29 in which the display device includes pairs of adjustment indicators suggesting upward or downward adjustment of each adjusting means of the potentiometer and the logic system determines which stage is to be adjusted and which of the indicators of a pair shall be effective for that stage.

31. The system of claim 30 in which the indicator selected is illuminated and in which the logic provides that when balance is achieved at that particular stage a status indicator will be illuminated.

32. The system of claim 31 in which the status indicator is used with calibrating means which shows in the status indicator a number representative of a calibration voltage.

33. The system of claim 29 in which the logic means is responsive to the position of the several manual adjusting means.

34. The system of claim 29 in which the logic means controls and changes the sensitivity level of the sensing means.

35. The system of claim 33 in which the logic means controls and changes the sensitivity level of the sensing means.

References Cited
UNITED STATES PATENTS

| | | | |
|---|---|---|---|
| 2,981,107 | 4/1961 | Anderson | 340—187 |
| 3,219,991 | 11/1965 | Freitas. | |
| 3,230,508 | 1/1966 | Grijseels et al. | 340—163 |
| 3,403,336 | 9/1968 | Coor et al. | 323—43.5 |

THOMAS B. HABECKER, Primary Examiner

MICHAEL R. SLOBASKY, Assistant Examiner

U.S. Cl. X.R.

324—98, 115; 340—186, 213, 316